Nov. 5, 1935.   V. BUECKERMANN   2,019,478
LIQUID LEVEL INDICATOR
Filed Oct. 17, 1933
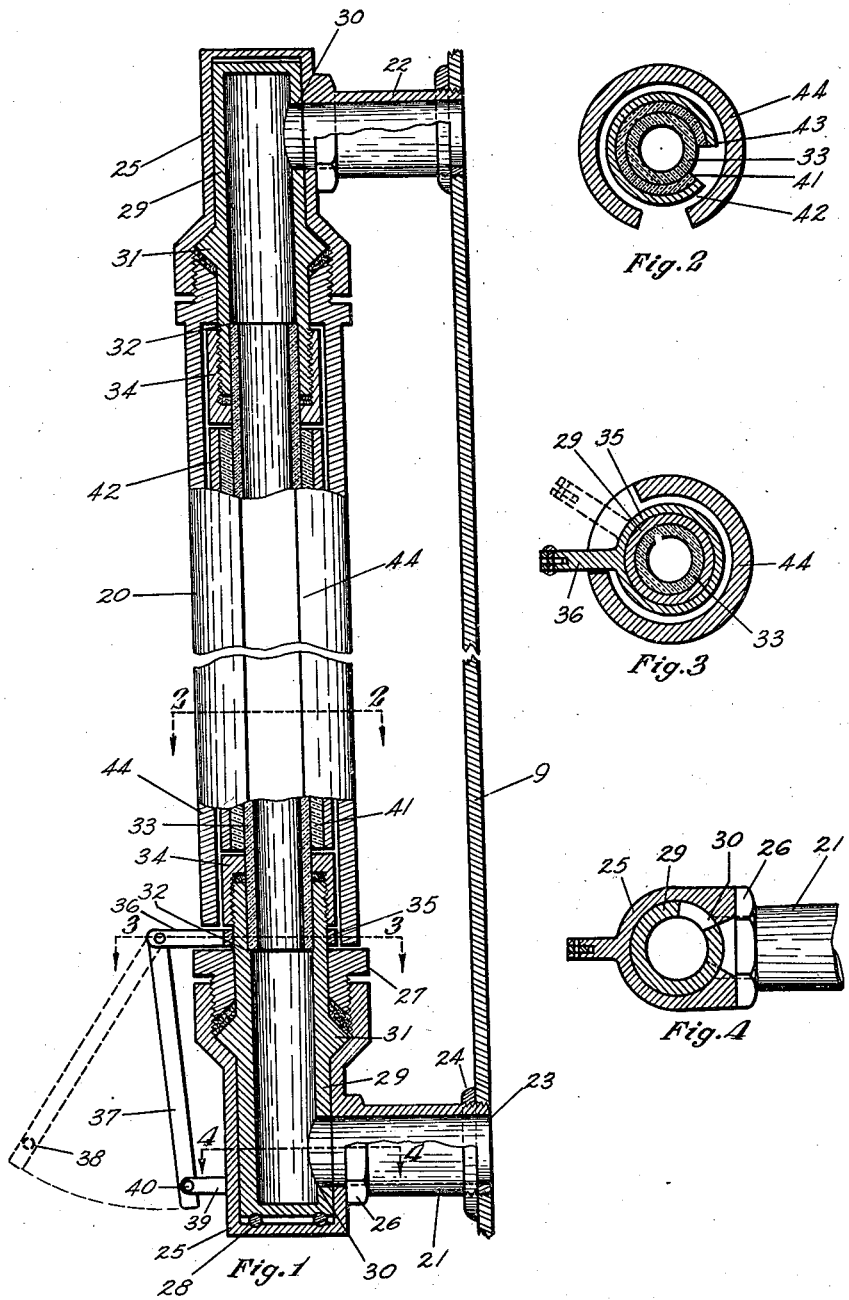
INVENTOR.
V. Bueckermann
BY
G. J. Rollandet
ATTORNEY.

Patented Nov. 5, 1935

2,019,478

UNITED STATES PATENT OFFICE 2,019,478

LIQUID LEVEL INDICATOR

Valentine Bueckermann, Cheyenne Wells, Colo.

Application October 17, 1933, Serial No. 693,926

5 Claims. (Cl. 73—54)

My invention relates to storage tanks for aeriform fluids and more particularly to tanks used for storage of gasoline and similar fluids which are subjected to frequent withdrawals of large quantities of liquid during the filling of tank trucks and the like.

It is the principal object of the present invention to provide means by which the volume of liquid within a tank can be readily determined by a person outside the tank without opening the tank to the atmosphere to obtain measurements as is now the practice in the art, and which results in the escape of large amounts of vaporized fluid.

Other objects reside in details of construction and arrangement of parts which will be more fully described in the course of the following description.

In the accompanying drawing in the various views of which like parts are similarly designated—

Figure 1 is an enlarged view, partly in section, of the volume measuring gage and associated valve structure;

Figure 2 is a section taken on line 2—2 Figure 1;

Figure 3 is a section taken on line 3—3 Figure 1, and

Figure 4 is a section taken on line 4—4 Figure 1.

In the drawing reference numeral 9 designates the wall of a storage tank to which is attached an upright column 20 for recording the height of the body of liquid in the tank. This column, whose construction is shown in Figure 1, is supported by nipples 21 and 22 at its lower and upper ends respectively. Nipple 21 is threadedly connected with the tank near its bottom at 23. A packing gland 24 is provided adjacent the threaded connection 23 to prevent leakage. At its opposite end nipple 21 is connected with an annular valve housing 25 by means of a headed connection 26. Nipple 22 is connected in a similar manner with the tank and the column.

The upper portion of valve housing 25 is enlarged and interiorly threaded to engage the threads of a packing nut 27. Seated on the bottom of valve housing 25 are balls 28 acting as a bearing for supporting a hollow annular valve 29, rotatable in the valve housing 25 and having a port 30 adapted to register with nipple 21 in its open position. The hollow interior of valve 29 provides a passage for liquid from the tank, entering thru port 30. The valve 29 is exteriorly shouldered at 31 to seat upon the enlarged surface of valve housing 25, and interiorly shouldered at 32. Seated on the shoulder 32 is a glass tubing 33 forming an extension of the liquid-passage in the valve 29. A packing gland 34 threadedly connected with the upper end of the valve 29 prevents leakage.

Between the packing gland 27 and the packing gland 34, a collar 35 is fitted on the valve 29. The collar has a laterally projecting arm 36, and pivoted on the outer end of arm 36 is a lever 37. The lever 37 is apertured near its free end at 38. This lever enables the operator to turn the valve and thereby open or close the port 30. A lug 39 apertured at 40 is secured to the lower portion of the valve housing 25, and when the valve 29 is closed, the lever can be swung down to bring aperture 37 in alinement with aperture 40 to permit the insertion of a padlock.

Encasing the glass tubing 33 is a layer of plaster of Paris, or other insulating material 41 which in addition to its insulating qualities protects the tubing from breakage. Fitted about the insulation layer 41 is a metal casing 42. The casing and insulation are both slotted at 43 to leave a portion of the tubing exposed thruout its length. The exterior portion of the casing 42 adjacent the slot 43 is marked with a graduated scale to measure the height of the liquid body. The upper end of the column is provided with a valve structure similar in all respects to that heretofore described, and the parts thereof are given numbers corresponding to those already described. The only differences between the two structures are that no ball bearings are provided in the upper housing 25, and in place of packing nut 34 a slotted annular casing 44 engages the interior threads of the housing and extends downwardly to a point adjacent the collar 35. The slot in casing 44 preferably faces north, so that the glass tubing 33 is not exposed to the sun's rays.

In the operation of the column, the lever 37 is first unlocked, and then is employed to rotate collar 35. Casing 42, insulation 41, tubing 33, and valve 29 are held in a fixed position relative to each other, and rotation of the collar produces a simultaneous rotary movement of these parts. When the collar is rotated sufficiently to bring slot 43 in register with the slot in the casing 44, ports 30 are in open position relative to nipples 21 and 22. Liquid from the tank flows into valve 29 and rises in tubing 33 to the height of the liquid body in the tank. The height is then determined by reference to the scale on casing 42, which is readily visible thru the slot in casing 44. After the reading has been taken, the lever is again used to return the collar to its original position, thereby closing the valves 29 and moving slot 43 to a shielded position. Liquid remains standing in column 20, but when the valves 29 are again opened, the liquid moves upwardly or downwardly to coincide with the height of liquid in the tank, and any gas formed at the top of the column escapes into the storage tank.

From the above description it will be apparent that when a storage tank is provided with a liquid level gauge or indicator like the one described above and shown on the drawing, volume measurements may be taken at any time and without making it necessary to open the tank, thereby preventing the escape of gases which would occur if the tank were opened. The tank is also provided with the usual temperature indicating means which has not been shown.

When a truck is to be filled from the tank the attendant takes a reading on the column or gauge and also a reading of the temperature so as to be able to compute the amount of liquid reduced to a given temperature. When the truck has been filled readings of the liquid level and the temperature are again taken to determine the actual volume of liquid remaining in the tank and the difference between these readings is the actual amount of liquid removed from the tank. Since the readings are taken without opening the tank there is no escape of gases and therefore no losses from this source.

What I claim and desire to secure by Letters Patent is:

1. A liquid measuring device comprising a housing having an opening for the intake of a fluid to be measured, a rotary valve in the housing having a port movable to a position in alinement with said opening, a transparent upright sight-tube in fluid tight connection with the valve for conjoint rotation therewith, means exteriorly of the housing for rotation of the valve to open and close the same, a shield carried by the tube for rotation therewith, having a lengthwise slot, and a relatively fixed casing enclosing the shield and having a lengthwise slot, the first-mentioned slot being movable to a position in register with the latter slot by an opening movement of the valve.

2. A liquid measuring device comprising a housing having openings at opposite ends thereof for the intake of a fluid to be measured, rotary valves in the housing controlling the flow of a fluid through said openings, a transparent sight-tube connecting the valves for conjoint rotation, means for effecting a conjoint movement of the valves by rotation of the tube, a shield carried by the tube for rotation therewith, having a lengthwise slot, and a relatively fixed casing enclosing the shield and having a lengthwise slot, the first-mentioned slot being movable to a position in register with the latter slot by an opening movement of the valves.

3. A liquid measuring device comprising a housing having openings at opposite ends thereof for the intake of a fluid to be measured, rotary valves in the housing controlling the flow of a fluid through said openings, a transparent sight-tube connecting the valves for conjoint rotation, means for effecting a conjoint movement of the valves by rotation of the tube, an insulating shield carried by the tube for rotation therewith, having a lengthwise slot, and a relatively fixed casing enclosing the shield and having a lengthwise slot, the first-mentioned slot being movable to a position in register with the latter slot by an opening movement of the valves.

4. A liquid measuring device comprising a housing having openings at opposite ends thereof for the intake of a fluid to be measured, rotary valves in the housing controlling the flow of a fluid through said openings, a transparent sight-tube connecting the valves for conjoint rotation, means for effecting a conjoint movement of the valves by rotation of the tube, a graduated shield carried by the tube for rotation therewith, having a lengthwise slot, and a relatively fixed casing enclosing the shield and having a lengthwise slot, the first-mentioned slot being movable to a position in register with the latter slot by an opening movement of the valves.

5. A liquid measuring device comprising a housing having an opening for the intake of a fluid to be measured, a rotary valve in the housing having a port movable to a position in alinement with said opening, a transparent upright sight-tube in fluid-tight connection with the valve for conjoint rotation therewith, means externally of the housing for rotation of the valve to open and close the same, a shield carried by the tube for rotation therewith, having a lengthwise slot, a relatively fixed casing enclosing the shield and having a lengthwise slot, the first-mentioned slot being angularly disposed relative to the axis of the port and movable to a position in register with the latter slot by an opening movement of the valve.

VALENTINE BUECKERMANN.